(12) United States Patent
Wu

(10) Patent No.: US 7,611,128 B2
(45) Date of Patent: Nov. 3, 2009

(54) LIFTER

(75) Inventor: Jung-Jen Wu, Taipei (TW)

(73) Assignee: Moteck Electric Corp., Taipei Hsien (TW)

( * ) Notice: Subject to any disclaimer, the term of this patent is extended or adjusted under 35 U.S.C. 154(b) by 519 days.

(21) Appl. No.: 11/468,303

(22) Filed: Aug. 30, 2006

(65) Prior Publication Data

US 2008/0073630 A1  Mar. 27, 2008

(51) Int. Cl.
*B21F 9/00* (2006.01)
(52) U.S. Cl. .................. 254/233; 254/234; 254/241
(58) Field of Classification Search .......... 254/233, 254/234, 241, 343, 296
See application file for complete search history.

(56) References Cited

U.S. PATENT DOCUMENTS

| | | | | |
|---|---|---|---|---|
| 3,788,607 A | * | 1/1974 | Crooks | 254/343 |
| 4,014,519 A | * | 3/1977 | Leigh | 254/423 |
| 4,132,322 A | * | 1/1979 | Loesch et al. | 414/313 |
| 4,176,827 A | * | 12/1979 | Anderson et al. | 254/343 |
| 4,344,608 A | * | 8/1982 | Mayr | 266/245 |
| RE34,142 E | * | 12/1992 | Fimeri | 74/89.14 |
| 5,255,594 A | * | 10/1993 | Grossi | 99/287 |
| 5,970,813 A | * | 10/1999 | Parkins et al. | 74/425 |
| 6,105,938 A | * | 8/2000 | Koida | 254/278 |
| 6,201,326 B1 | * | 3/2001 | Klappenbach et al. | 310/75 R |
| 7,275,791 B2 | * | 10/2007 | Sakamaki | 297/362.14 |
| 2005/0115343 A1 | * | 6/2005 | Sakamaki | 74/89.23 |
| 2005/0116132 A1 | * | 6/2005 | Sakamaki | 248/424 |
| 2006/0037420 A1 | * | 2/2006 | Mast et al. | 74/89.14 |

* cited by examiner

*Primary Examiner*—Emmanuel M Marcelo
(74) *Attorney, Agent, or Firm*—Muncy, Geissler, Olds & Lowe, PLLC

(57) ABSTRACT

A lifter is disclosed using two transmission mechanisms at two sides of a housing for lifting, for example, a bed or chair, each transmission mechanism including a motor, a worm gear wheel meshed with a worm shaft as the output of the motor, a screw rod threaded into an inner thread in the hollow gear shaft of the worm gear wheel, a push block fixedly fastened to one end of the screw rod and moved with the screw rod to lift/lower the load upon rotation of the motor, and a sliding block fixedly fastened to the other end of the screw rod to guide axial displacement of the screw rod in the housing.

6 Claims, 7 Drawing Sheets

LIFTER

BACKGROUND OF THE INVENTION

1. Field of the Invention

The present invention relates to lifters, and more particularly, to a simple structure of durable lifter, which is practical for use to lift two sections of an object independently.

2. Description of the Related Art

A lifter is a tool for changing the positions of some parts of an object. Different lifters have been developed for different lifting purposes.

A conventional lifter is known comprising a driving motor, a transmission mechanism, and a push member. The driving motor rotates the screw and gear structure of the transmission mechanism to move the push member and to further change the position of the load. The push member is threaded onto the screw rod. Upon rotation of the screw rod by the motor, the push member is moved axially along the screw rod. According to this design, the screw rod may bias slightly to give a great pressure to the driving motor during working, thereby shortening the service life of the driving motor, push member or gear structure. Further, when lifting an object having a great carcase section, two lifters shall be used to support the object at two sides. When using two lifters to lift an object, the installation cost is greatly increased.

SUMMARY OF THE INVENTION

The present invention has been accomplished under the circumstances in view. It is the main object of the present invention to provide a lifter, which is practical and durable in use and does not vibrate when lifting/lowering the load. To achieve this and other objects of the present invention, the lifter comprises a housing, which defines therein an accommodation chamber, and two transmission mechanisms mounted in the accommodation chamber at two sides. Each transmission mechanism comprises a motor. a worm gear wheel meshed with a worm shaft at the output of the motor, a screw rod threaded into an inner thread in the hollow gear shaft of the worm gear wheel, a push block fixedly fastened to one end of the screw rod and moved with the screw rod to lift/lower the load upon rotation of the motor, and a sliding block fixedly fastened to the other end of the screw rod to guide axial displacement of the screw rod in the housing.

DETAILED DESCRIPTION OF THE PREFERRED EMBODIMENT

Figure 1:
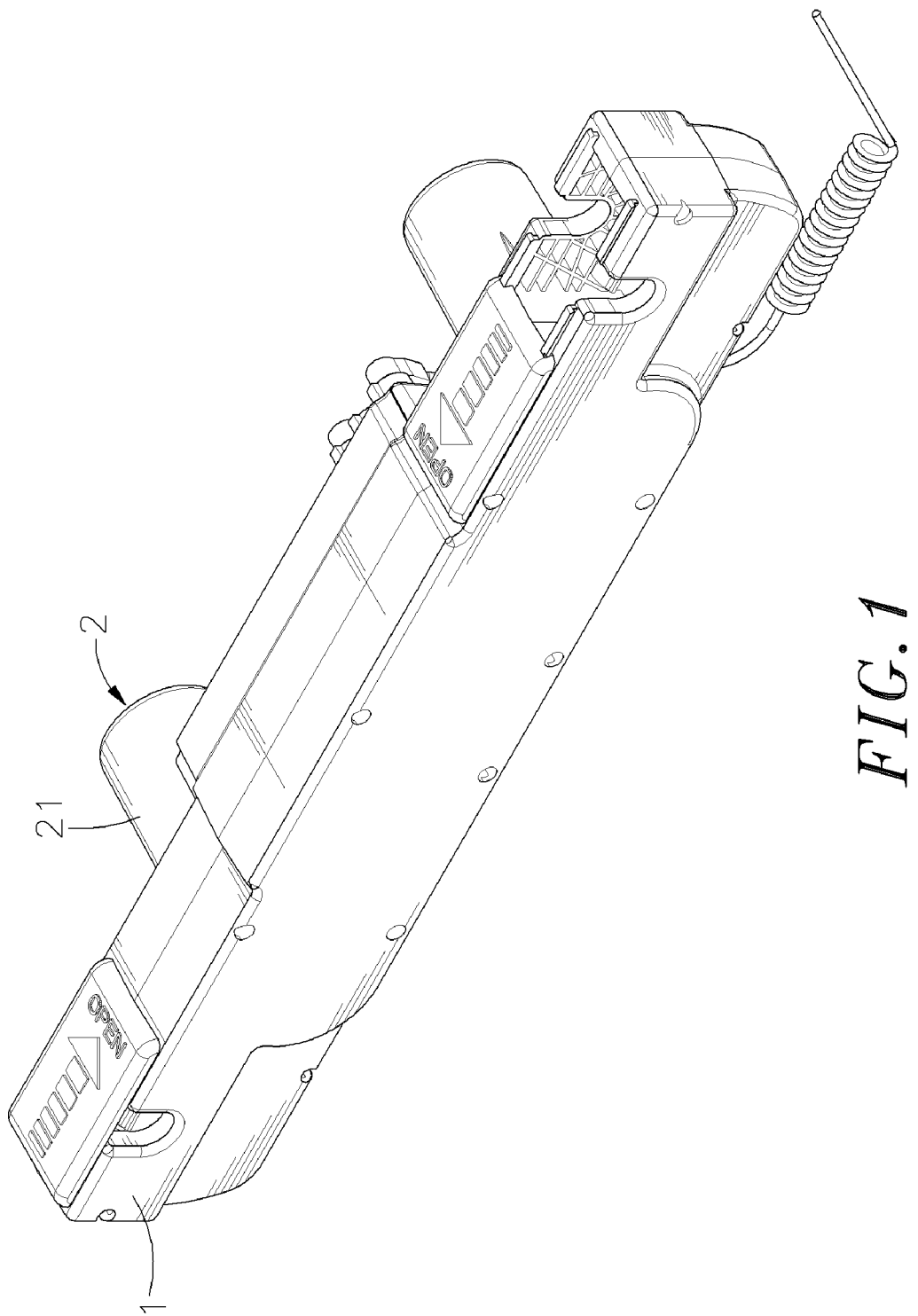
FIG. 1 is an elevational view of a lifter in accordance with one embodiment of the present invention.
Figure 2:
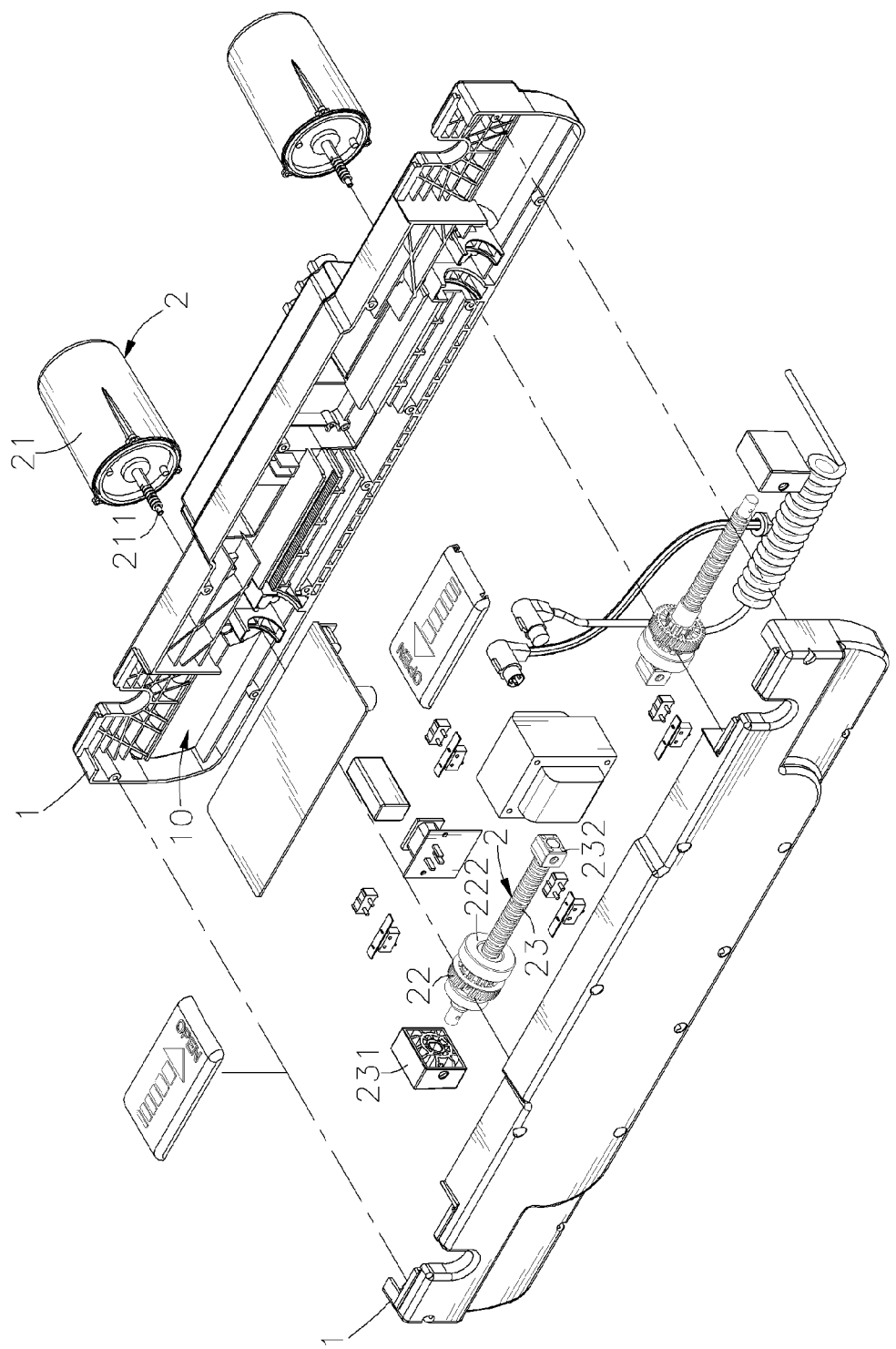
FIG. 2 is an exploded view of the lifter according to the present invention.
Figure 3:
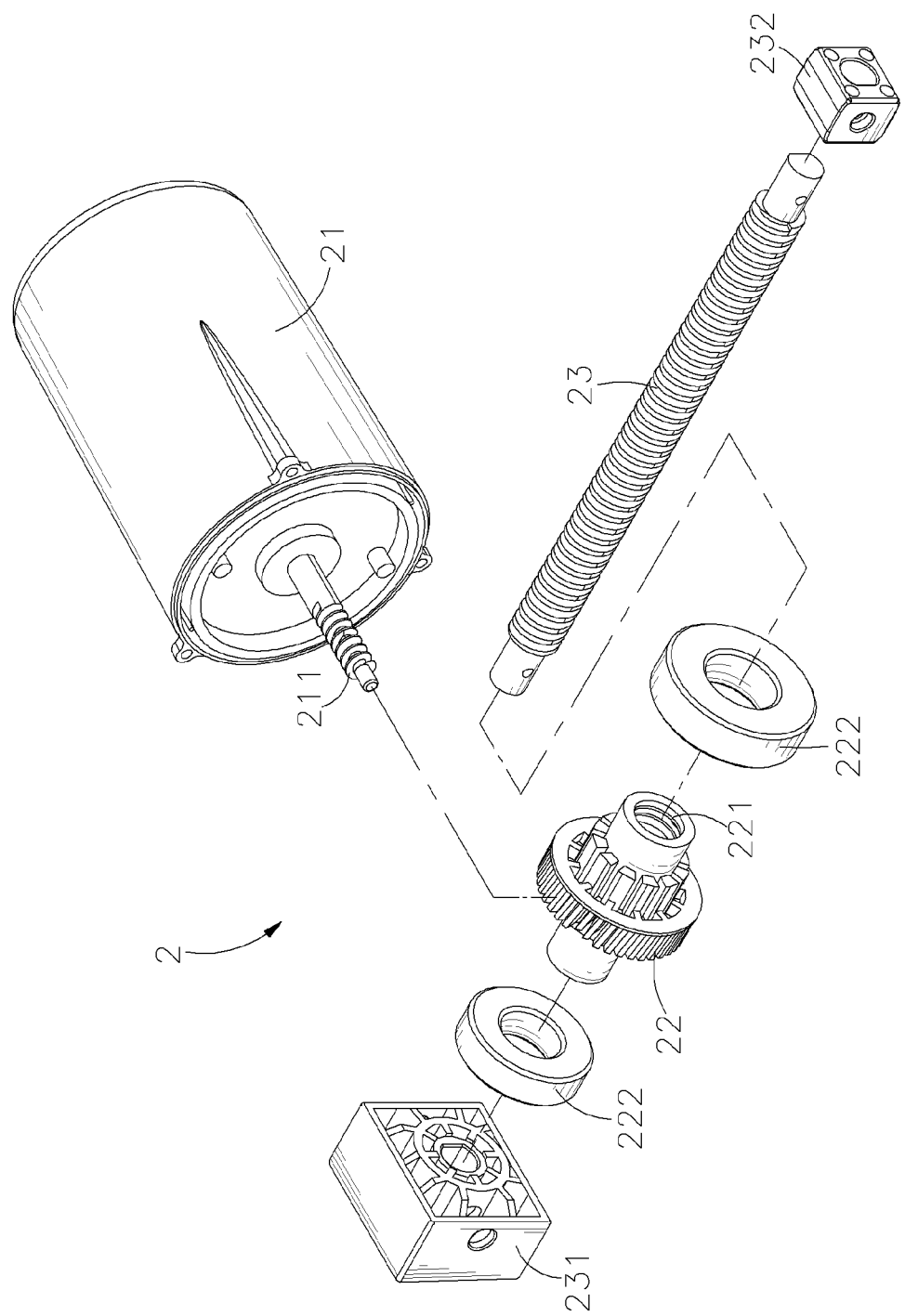
FIG. 3 is an exploded view in an enlarged scale of a part of the lifter according to the present invention.

Referring to FIGS. 1~3, a lifter in accordance with the present invention is shown comprised of a housing 1 and two transmission mechanisms 2.

The housing 1 defines therein an accommodation chamber 10. The transmission mechanisms 2 are mounted in the accommodation chamber 10 at two sides, each comprising a motor 21, which has an output worm shaft 211, a worm gear wheel 22, which is meshed with the output worm shaft 211 and has an inner thread 221 in the hollow gear shaft thereof, a screw rod 23 threaded into the inner thread 221 in the hollow gear shaft of the worm gear wheel 22, a push block 231 fixedly fastened to one end of the screw rod 23, a sliding block 232 fixedly fastened to the other end of the screw rod 23, and at least one, for example, two axle bearings 222 respectively mounted on the worm gear wheel 22 at two sides.

The arrangement of the aforesaid axle bearings 222 hold the worm gear wheel 22 firmly and prevents friction loss caused by the push block 231 or sliding block 232 during working of the worm gear wheel 22, thereby improving the transmission efficiency of the worm gear wheel 22 and prolonging the service life of the motor 21 and also the worm gear wheel 22. Further, the motor 21 can be a DC motor. Any of a variety of equivalent means, for example, a server motor may be used to substitute for the motor 21.

Figure 4:
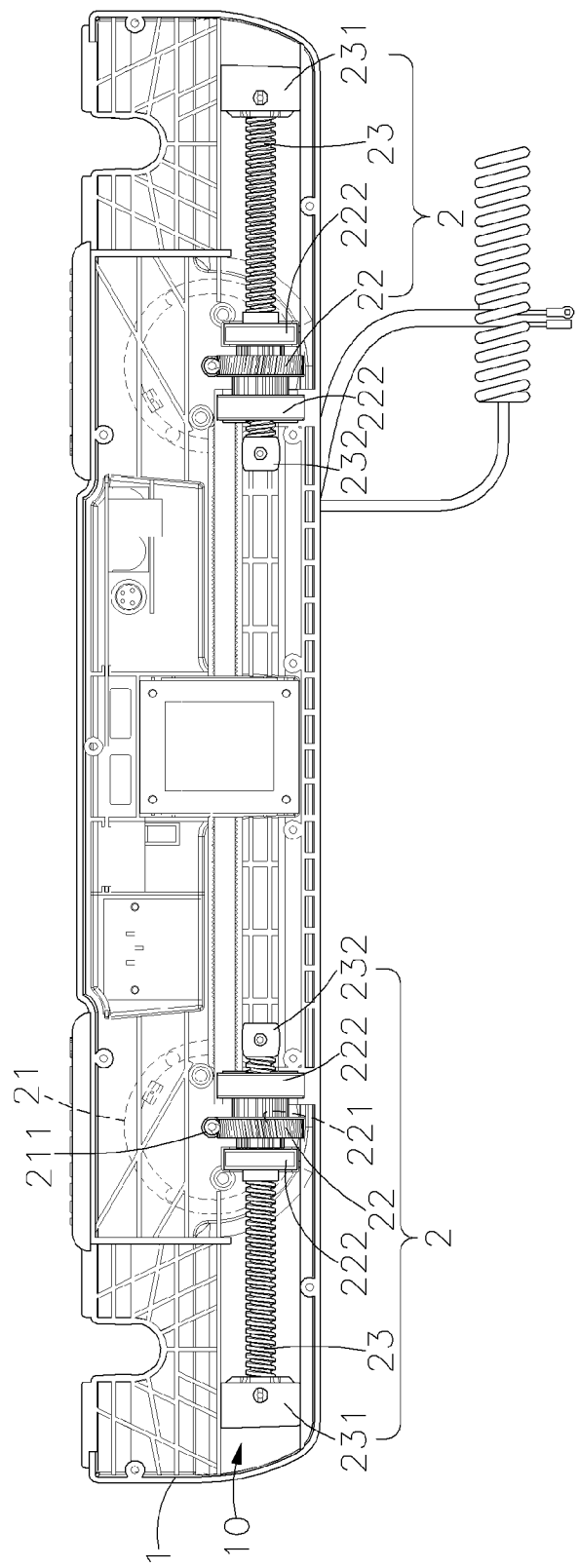
FIG. 4 is a sectional side view of the lifter according to present invention.

FIG. 4 is a sectional view of the lifter according to the present invention. When the motors 21 are started to rotate the associated worm shaft 211, the associated worm gear wheel 22 are rotated, thereby causing axial displacement of the associated screw rods 23, and therefore the push blocks 231 are moved to lift the load.

Figure 5:
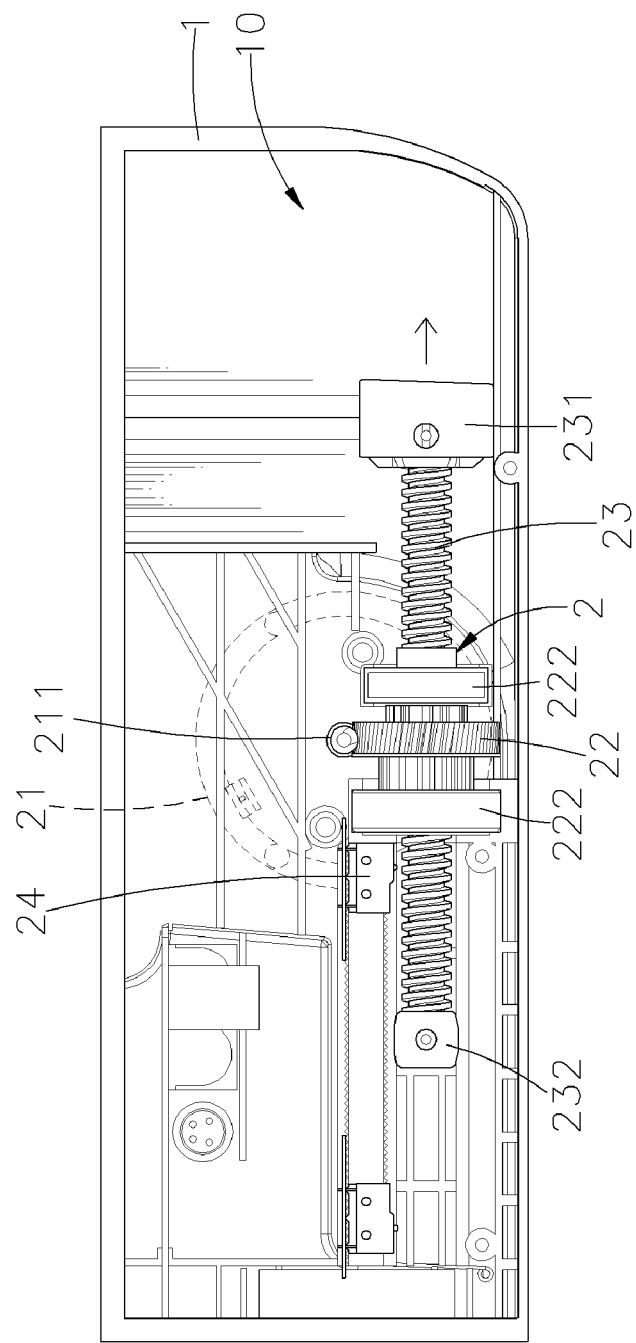
FIG. 5 is a schematic sectional view of an alternate form of the lifter according to the present invention.
Figure 6:
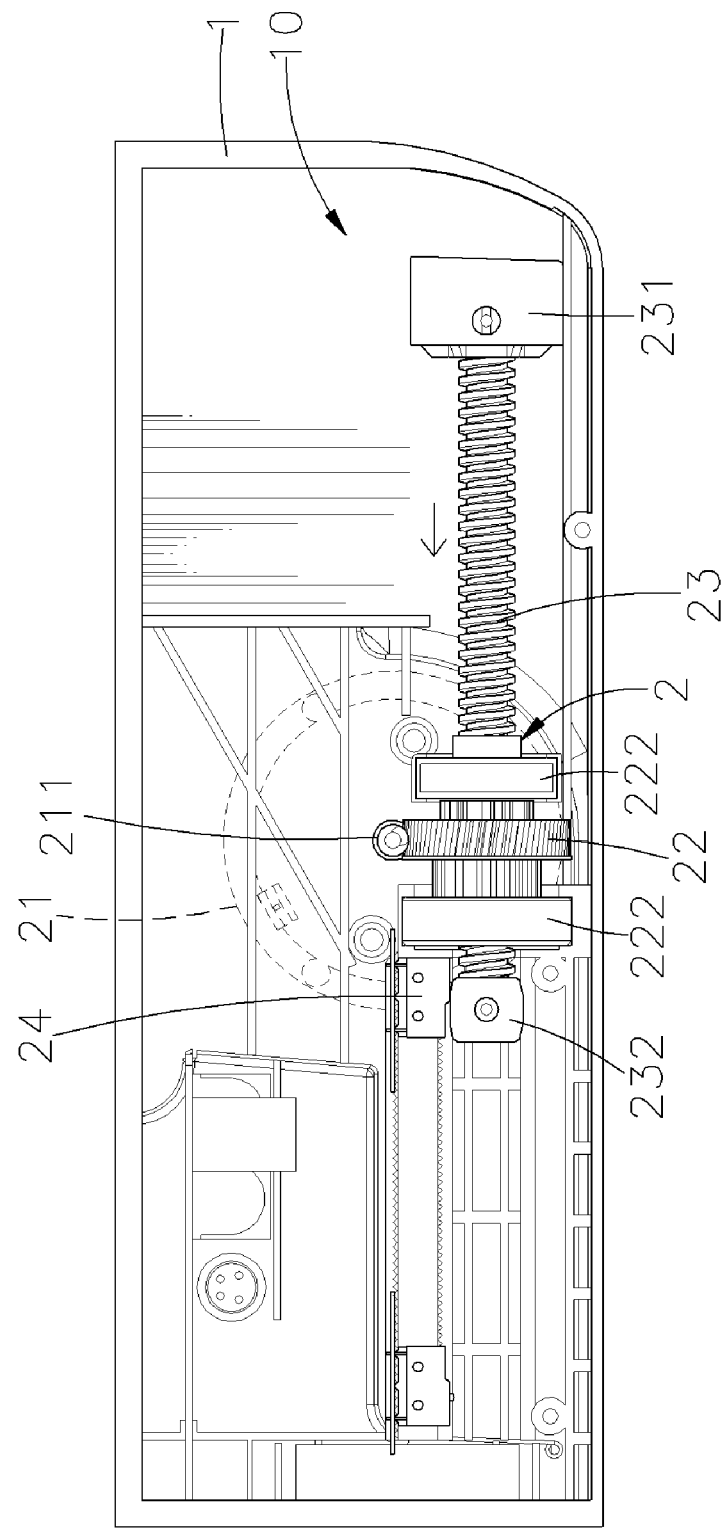
FIG. 6 is similar to FIG. 5 but showing the screw rod moved to one side.

FIGS. 5 and 6 show an alternate form of the lifter according to the present invention. According to this embodiment, two pair of limit switches 24 are fixedly mounted in the accommodation chamber 10 inside the housing 1, and spaced at one side of the path in which the sliding block 232 of each transmission mechanism 2 is traveling. Each limit switch 24 stops the motor 21 of the associating transmission mechanism 2 when touched by the associating sliding block 232 for further displacement.

Figure 7:
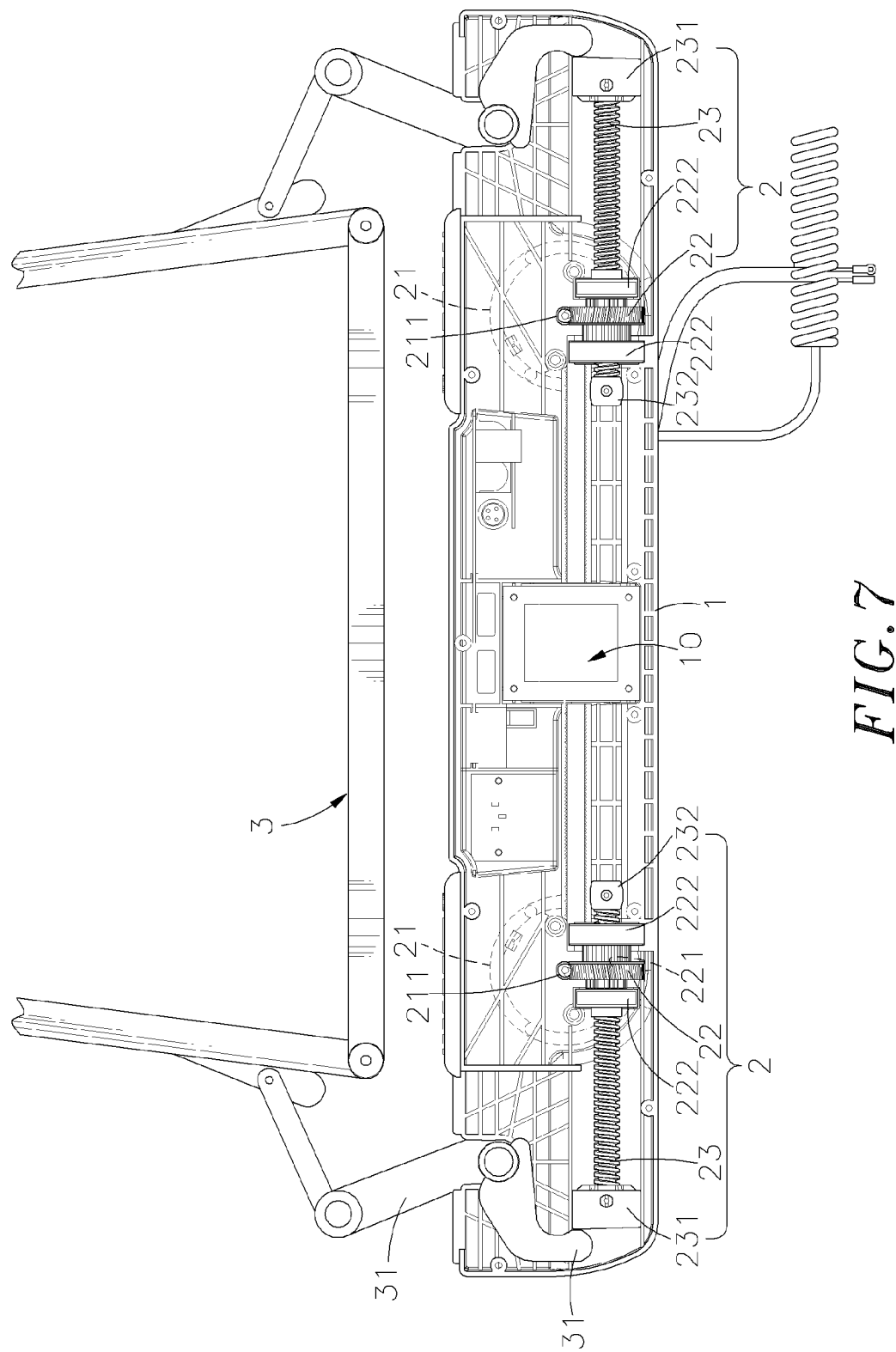
FIG. 7 is a schematic view showing an application example of the present invention.

Referring to FIG. 7, the lifter can be used in a bed 3. As illustrated, the bed 3 has two linkages 31 at two sides. When started the motors 21 to move the associated screw rods 23, the associated push blocks 231 are driven to push the linkages 31, thereby lifting or lowering the bed 3.

In the aforesaid application example, the lifter of the present invention is used to lift a bed. The lifter can also be used for other applications, for example, for lifting a chair.

As stated above, the invention provides a lifter, which comprises two transmission mechanisms 2 arranged at two sides in a housing 1, each transmission mechanism 2 using a motor 21 to cause axial displacement of a respective screw rod 23 and to further drive a push block 231 to move the load. By means of the guide of the sliding block 232, the associated screw rod 23 is moved smoothly and stably in course without vibration.

A prototype of lifter has been constructed with the features of FIGS. 1~7. The lifter functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A lifter comprising a housing, said housing defining therein an accommodation chamber;

two transmission mechanisms mounted in said accommodation chamber at two sides, said transmission mechanisms each comprising a motor, said motor having an output worm shaft, a worm gear wheel meshed with said worm shaft and rotatable by said worm shaft upon rotation of said motor, said worm gear wheel having an inner thread in a hollow gear shaft thereof, a screw rod threaded into said inner thread of said worm gear wheel, and a push block fixedly fastened to one end of said screw rod and moved with said screw rod to move a load upon rotation of said motor; and two pairs of limit switches respectively fixedly mounted in said accommodation chamber inside said housing and adapted to control the direction of the motors of said transmission mechanism; said transmission mechanisms each further comprise a sliding block respectively fixedly mounted on one end of the associating screw rod opposite to the associating push block for touching said limit switches to cause said limit switches to the associating motor for limiting displacement.

2. The lifter as claimed in claim 1, wherein said motor is a DC motor.

3. The lifter as claimed in claim 1, wherein said motor is a server motor.

4. The lifter as claimed in claim 1, wherein said transmission mechanisms each further comprise at least one axle bearing adapted to support rotation of the associating worm gear wheel.

5. The lifter as claimed in claim 1, wherein the push blocks of said transmission mechanisms are adapted to lift a bed.

6. The lifter as claimed in claim 1, wherein the push blocks of said transmission mechanisms are adapted to lift a chair.

* * * * *